BUSY LINE OR TRUNK INDICATING CIRCUIT

Filed Feb. 9, 1961 4 Sheets-Sheet 1

INVENTORS
ROLF AUGUST DAHLBLOM
BERNHARD LILLSUNDE
By Hane and Nydick
ATTORNEYS

BUSY LINE OR TRUNK INDICATING CIRCUIT

Filed Feb. 9, 1961 4 Sheets-Sheet 2

INVENTORS
ROLF AUGUST DAHLBLOM
BERNHARD LILLSUNDE
By Hane and Nydick
ATTORNEYS

May 25, 1965 R. A. DAHLBLOM ETAL 3,185,771

BUSY LINE OR TRUNK INDICATING CIRCUIT

Filed Feb. 9, 1961 4 Sheets-Sheet 3

INVENTORS
ROLF AUGUST DAHLBLOM
BERNHARD LILLSUNDE
BY Howard Nydick
ATTORNEYS

May 25, 1965 R. A. DAHLBLOM ET AL 3,185,771

BUSY LINE OR TRUNK INDICATING CIRCUIT

Filed Feb. 9, 1961 4 Sheets-Sheet 4

INVENTORS
ROLF AUGUST DAHLBLOM
BERNHARD LILLSUNDE
By Hane and Nydick
ATTORNEYS

United States Patent Office 3,185,771
Patented May 25, 1965

3,185,771

BUSY LINE OR TRUNK INDICATING CIRCUIT

Rolf August Dahlblom and Bernhard Lillsunde, Hagersten Sweden, assignors to Telefonaktiebolaget L M Ericsson, Stockholm, Sweden, a corporation of Sweden
Filed Feb. 9, 1961, Ser. No. 88,131
Claims priority, application Sweden, Feb. 15, 1960, 1,493/60
2 Claims. (Cl. 179—18)

The present invention refers to a circuit arrangement for indicating for a calling subscriber that the connection to the called subscriber cannot be set up.

More particularly, the invention relates to an automatic telephone system in which a calling subscriber through idle selector stages is connected to an idle connecting relay set by means of a marker having testing means which are operated depending on the occupied or idle marking potential condition of a test wire connected to the respective connecting means (selector, connecting relay set). In such system, conditions preventing the setting up of the connection (the subscriber is busy, there is congestion due to overload, the digit selection has been carried out with too great delay and the register has been released, and so on) are indicated by connecting means producing a buzzing sound to the speech circuit of the calling subscriber by means of a blocking relay arranged in the line equipment of the calling subscriber this relay connects the buzzing sound producing means to the line of the calling subscriber when the called subscriber is busy or congestion is present. Such an arrangement makes a blocking relay necessary in the line equipment of each subscriber, so that said blocking relays represent a substantial part of the total costs of the installation.

The object of the present invention is to save said blocking relays and instead of using means individual for each subscriber, to use means which belong to the common equipment of the exchange, so that a better use of them can be made.

The invention is substantially characterized by the fact that in order to indicate an obstacle to the setting up of the connection, the connecting relay set is adapted to be energized in connection with the speech circuit of the calling subscriber through the selectors set up, all test means in the marker are adapted when calling and finding a busy condition in too many connecting means (selectors, connecting relay sets) to be connected to a potential which compensates the busy marking potential condition of the test wires of the connecting means (selectors, connecting relay sets) constituting part of a connection between a subscriber and a connecting relay set indicating an obstacle to the setting up of a speech connection, in order to allow a new selection between means occupied by such a connection.

Figure 1:
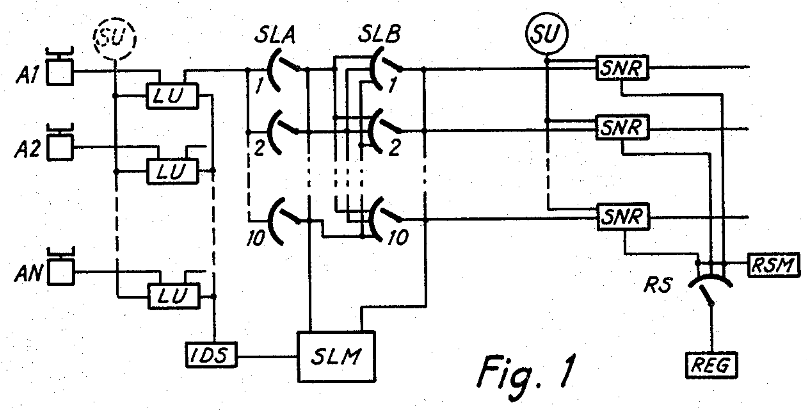
Figure 5:
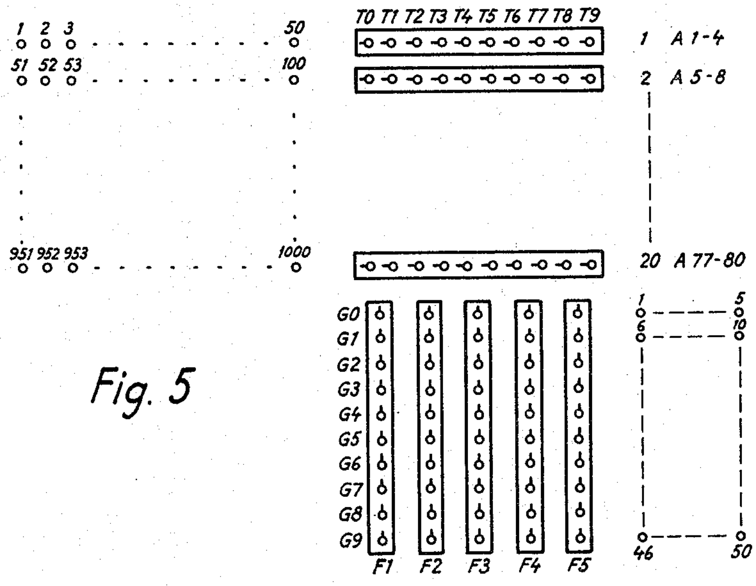
Figure 6:
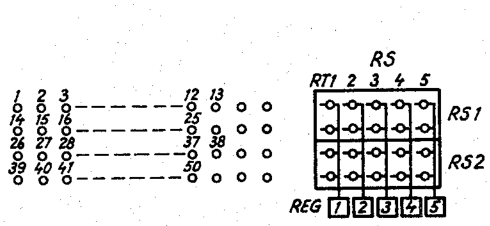
Figure 2:
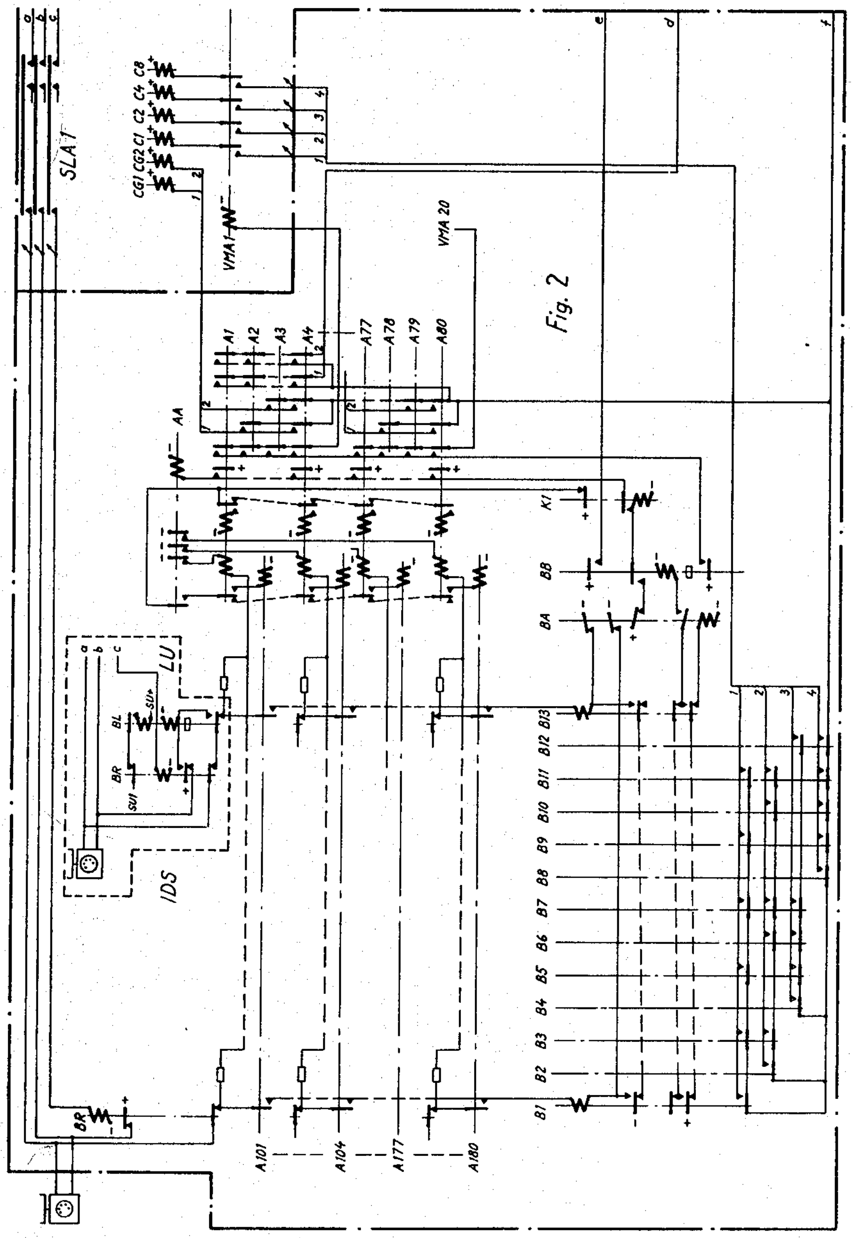
Figure 3:
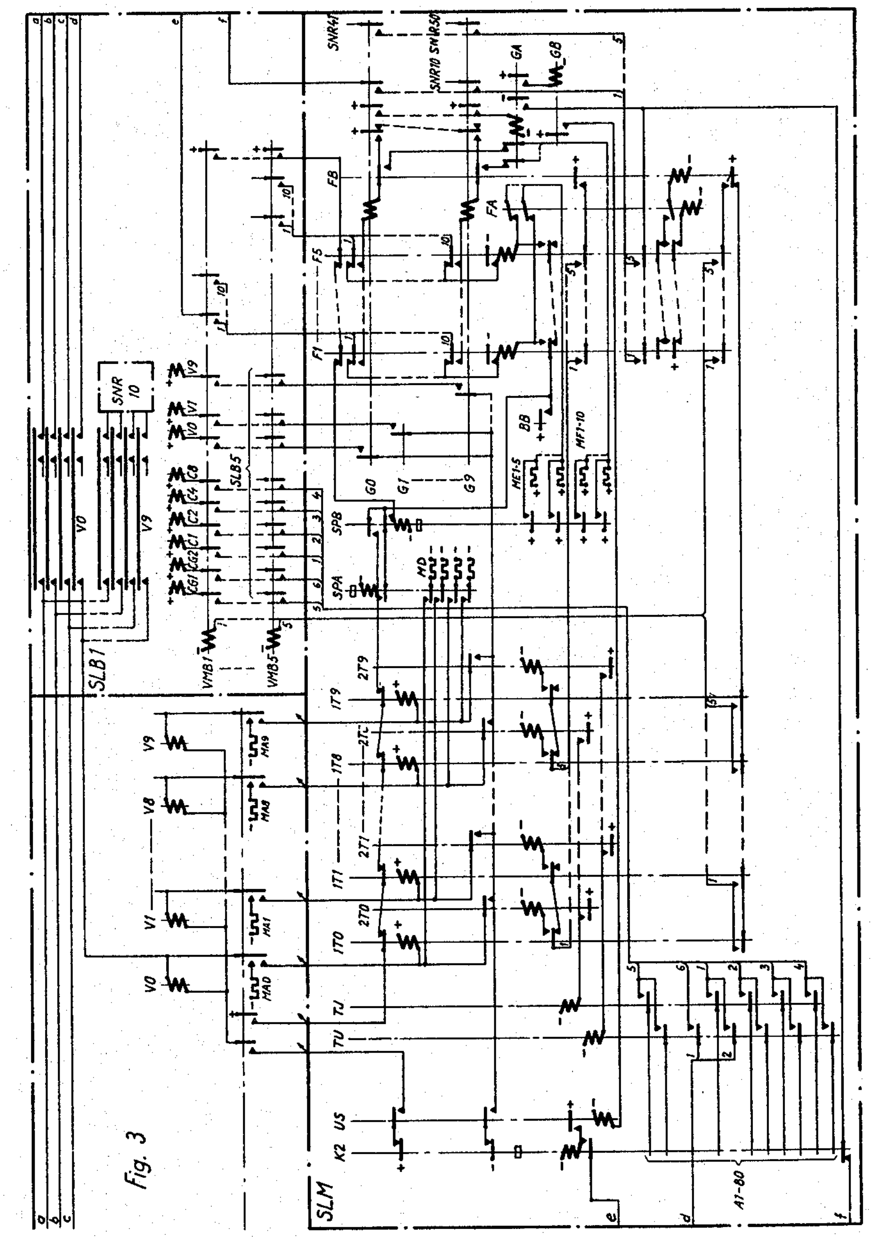

The invention will be explained more in detail by means of an embodiment with reference to the enclosed drawing, on which FIG. 1 shows a block diagram of a telephone establishment, FIGS. 2–3 show a circuit diagram of a telephone installation built up of selectors of the cross bar type, and on which the principle of the invention has been applied, and FIGS. 5–6 show the grouping of the bridges in said telephone establishment.

FIG. 1 shows diagrammatically a telephone installation comprising selector stages SLA, SLB including selectors of any suitable type. A calling subscriber can be connected by means of a marker SLM to a connecting relay set SNR through relay set selectors belonging to the selector stages SLA, SLB. Through SNR the subscriber is connected to a register REG which stores the digit signals obtained from the subscriber and sends said signals in forward direction for setting up further selector stages. If there is any obstacle against the setting up of the connection, for example if the called subscriber is busy, if there is congestion due to lack of connecting means or the digit selection has been too slow so that the register has been released, and so on, this fact is marked on a test wire to the line equipment LU of the subscriber in which a relay connects buzzing sound to the speech circuit of the subscriber from a buzzing sound source SU shown by dashed lines. As mentioned before, the individual relays in the line equipment, however, constitute for each of the subscribers a substantial cost and for this reason the connecting relay SNR is constructed in such manner, according to the invention, that when there is an obstacle against the setting up of a connection, a buzzing tone is connected to the speech circuit of the calling subscriber by means of relay set SNR which is maintained connected through said speech circuit and through the selectors SLA and SLB and as long as the subscriber is listening to the busy tone maintains the speech circuit closed.

It is easy to see that instead of using one relay in each line equipment, in this way only one relay is used in each relay set SNR for busy signalling which in an exchange having 1000 subscriber's lines and 50 SNR-relay sets will result in a saving of 950 relays. At the same time it is not allowed to decrease the traffic capacity by maintaining connecting means busy, for signalling from SNR when said means are necessary for setting up new connections. For this reason according to the present invention a connection indicating an obstacle against the setting up of the conversation connection is maintained as long as the connecting means are not necessary for the traffic. Thus if all the selectors in the respective stages or all the SNR, the combination of which is necessary for setting up a new conversation, should be busy when a new call is to be carried out and said busy means are occupied by a connection between the subscriber and a connecting relay set indicating an obstacle, said means will be released by means of the marker, as will be explained in connection with the detailed circuit diagram. In this case the busy tone to the waiting subscriber is of course interrupted which however is without any importance as he has already heard the busy tone. It is however not necessary to connect any buzzing sound at all to the speech circuit of the calling subscriber, for signalling for example, a congestion condition, but it is also possible that the subscriber in an exchange which does not have an own buzzing sound source, receives knowledge of congestion due to traffic load by not hearing any tone at all. Normally this last mentioned operation is also carried out by operation of a blocking relay found in the line equipment of the subscriber. Also in this case the invention can be applied and it is possible to replace said blocking relay which is individual for each subscriber, by the special connecting relay set in such a manner that the speech circuit of the subscriber is connected to the connecting relay set without producing any buzzing sound when there is for example congestion in the exchange. The saving will be evident also in this case.

Figure 4:
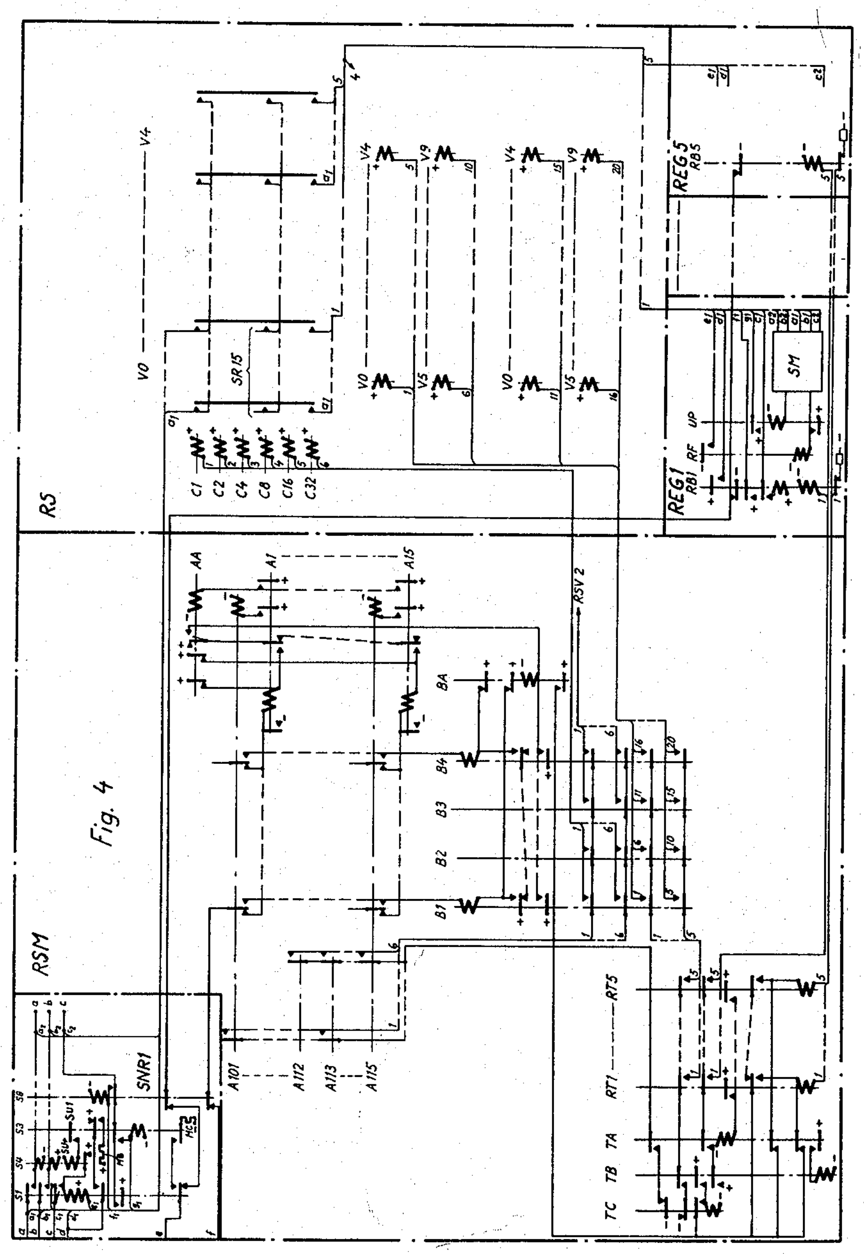

FIGS. 2–4 show an example of the application of the invention on a telephone installation consisting of code relay selectors. The code relay selector is described in Swedish Patent 167,443. The selectors can of course consist of usual cross bar selectors or of step-by-step operated selectors or selectors of any suitable type as the principle of the invention is quite independent of the type of the selector. According to the example code relay selectors are used in which each bridge has 17 vertical contact rows each with 12 contacts. According to the need, for example 12 incoming wires can be connected to 16 alternative outgoing wire groups each having 12 wires, or 3 incoming wires can be connected to 52 contact groups (of which only 50 are used) by means of group selection and by operating two vertical rows simultaneously, or 4 incoming wires can be connected to 42 contact groups (of which only 40 are used) as is well known from the cross bar selector technics. The first mentioned type is used in the register finder (FIG. 4), the second in the SLA-stage (FIG. 2) and the lastmentioned type in the SLB-stage (FIG 3.). Each selector comprises 10 bridges. The vertical rows are operated each by means of its lifting means, of which only those can carry out their function which can freely pass through a transverse cut-outs in code bars which are located near to each other and are displaceable. By the displacement of said code bars relatively to their resting position in different combinations, cut-outs are placed below the selected vertical rows of contacts as described in detail in said patent. In the device according to the example, the number of the code bars is 6 and each is operated by means of its code magnet.

When calling a subscriber A lifts his handset and closes the subscriber's loop of the line equipment in the exchange, so that the subscriber is connected to the identifier IDS. A group of subscribers, for example 1000, are served by an identifier and a marker according to the example. Assuming that an input can be connected to 50 outputs, there are 20 selectors necessary for 1000 subscribers. The identifier consists of a system of "horizontal" and "vertical" wires crossing each other, to each of which a relay is connected. There are altogether 80 horizontal wires, to which the relays A1–A80 are connected, corresponding to the 4 x 20 rows in the 20 selectors, and 13 vertical rows co-operating with the relays B1–B13, corresponding to the 13 vertical contact rows in the selectors. Each subscriber is connected to its crossing point in said system in a manner known per se. When the crossing point obtains plus potential in consequence of the subscriber lifting his handset, at first the relay belonging to the horizontal row, for example A2, will operate when it is assumed that the subscriber having subscriber number 11 and being connected to selector number 1, has lifted his hand-set. The A-relays have two windings, an operating winding and a holding winding, the purpose of which will be explained later. Secondarily to the relay A2 the relay AA will operate which interrupts the polarity for the operating windings of all the other A-relays, so that only one A-relay can be operated at the same time. The relay AA connects a current path through the contact of the relay A2 to the relay A102. The relays A101–A180 are secondary relays of the relays A1–A80 and have the purpose to connect the vertical wires to the B-chain. Only one of the relays A101–A180 can be maintained operated at the same time. When the relay A102 has operated, the calling polarity from the subscriber is connected to the vertical wire belonging to the subscriber, so that the corresponding B-relay, in this case B1, will operate. Secondarily the relay BA which is a spacing current relay, releases and feeds potential to the B-chain. By the releasing of the BA-relay the polarity to all the B-relays is interrupted excepted to B1 which holds itself through its own contact. By the operation of an A-relay and a B-relay the subscriber is identified. The BB-relay operates secondarily to the relay B1 and its purpose is to connect through a contact of the A1-relay, operating polarity to one of the 20 connecting relays VMA1–20, which relay connects to the marker the selector, in this case the selector having number 1 to the multiple of which the subscriber is connected. As mentioned before, when having 50 outputs for each bridge, there are 20 selectors necessary for 1000 subscribers when having at least one bridge in each selector but in view of the multiplying there is a number of bridges, for example 10, in each selector. As the contact groups are arranged in 4 horizontal rows, the number of the selector to which the subscriber belongs, determines which ones of the four relays of the 80 A-relays can operate. When the subscriber belongs for example to the first selector SLA1 (see FIG. 5), one of the relays A1–A4 will operate, and so on. The purpose of the relay VMA1 is to connect upon its operation, the test wires of all the bridges in the SLA1-selector to the marker. As test wire a wire connected to the bridge magnet is used, oppositely to usual cross bar selectors in which the busy condition is marked by means of a contact on the bridge. If the bridge is idle, there is no polarity on the test wire, but when the bridge is busy, there is plus polarity. The marker comprises a number, in this case 10, test relays 1T0–1T9 (FIG. 3) corresponding to the number of bridges in one selector. The relay VMA1 connects the test relays on one hand to the test wires, on the other hand simultaneously to minus polarity through the resistances MA0–MA9. The test relays which correspond to idle bridges, operate by means of minus through the resistances as the test wire has no potential while the test relays which correspond to busy bridges, do not operate as the plus polarity on the test wire shirt-circuits the winding.

The co-operation between the bridges in the SLA- and SLB-selectors appears from FIG. 5 which shows a grouping of the bridges. As mentioned before, there are 20 SLA-selectors which co-operate with a suitable number of SLB-selectors. In both the SLA- and the SLB-selectors there are 10 bridges. When supposing that the B-bridges each have 40 outputs due to the through-connection necessitating 4 wires, each B-bridge can reach 2 bridges in each of the 20 A-selectors. The B-bridges are multiplied in such a manner that the bridges in the same B-selectors have common outputs, in other words, so that the 10 bridges in each B-selector can reach the 40 bridges divided over the 20 A-selectors in two adjacent vertical rows. From the above appears that 5 B-selectors will correspond to 20 A-selectors.

After the marker has determined which of the A-bridges is idle, the marker will test which ones of the B-bridges that can co-operate wtih the idle SLA-bridges, are idle. Through contacts of the idle and consequently operated test relays 1T a potential is connected to the connecting relays VMB1–5 belonging to the SLB-selectors which may be used. It can be said generally that each SKB-bridge belongs to a connecting relay set SNR, so that testing of idle SLB-bridges constitutes testing of idle connecting relay sets SNR. All connecting relay sets, according to the example 50, are connected through contacts of the relays VMB1–5 to 5 relays F1–F5, each corresponding to an SLB-selector or to the 10 connecting relay sets belonging to each of said selectors. When there is at least one idle connecting relay set SNR belonging to an idle SLB-selector, the F-relay corresponding to the selector will operate with minus polarity from a busy relay RB in one of the idle registers and break contacts of a connection completing relay S1 and a busy marking relay S8 in one of the idle connecting relay sets. If more connecting relay sets SNR belonging to different SLB-selectors are idle, the F-relays corresponding to the selectors operate and one of them is broken out, whereupon the relay FA releases. Thereafter the relay FB which has operated secondarily to the relay F, connects another relay chain G0–G9 to the 10 connecting relay sets which belong to the selected B-selector, one of the connecting relay sets being selected in such a manner that one of the G-relays operates and disconnects the other connecting relay sets. Now one of the F-relays and one of the G-relays have operated, so that the connecting relay set and hereby the SLB-bridge is determined. It follows that also the two vertical bridge rows in the selectors A according to FIG. 5 are determined. As of the 40 bridges in said two vertical rows only the two bridges can be reached by the subscriber which are located in the selector of the subscriber, a selection has to be carried out between said two bridges, if both are idle. The F-relay belonging to the activated SLB-selector connects operating plus potential to one or two secondary test relays for example 2T0–2T1, through contacts of the operated primary SLA-test relays for example 1T0–1T1. One of the secondary relays operates and prepares a current path for operation of the SLA-bridge belonging to this relay.

A register REG has now to be selected which has to be connected to the connecting relay set. This is carried out in such manner that the SLM-marker through the connecting relay set SNR calls the register finder marker RSM by means of minus polarity through the make contact of the relay GA and of the operated F- and G-relay respectively. The register finder marker RSM comprises an identifier and according to the embodiment 5 test relays RT1–RT5 for finding an idle register among the 5 registers REG1–REG5 being at disposal. The identifier is constructed for identifying 50 inputs and may be a conventional wire-identifier having horizontal and vertical wires crossing each other, the relays A1–A15 being connected to 15 horizontal wires and the relays B1–B4 to 4 vertical wires. Said grouping is a consequence of the placing of the contacts in the RS-selectors as will be clear herebelow. When calling from a connecting relay set belonging to a definite crossing point, for example SNR1, at first the A-relay A1 belonging to the horizontal wire will operate and switch all the calling paths belonging to said wire, to the B-relays. Of the B-relays only the one which belongs to the respective vertical row, in this case B1, can operate and in this manner the connecting relay set is identified. After identification, plus polarity is connected from the make contact of the relay BA through the test relays RT1–5 to those registers REG1–5 which are idle and consequently have minus polarity at the break contact of the relay RB. The test relays RT1–5 which are connected to idle REG operate. As they are connected in a breaking out chain and the operating current path through the relay TA which has operated secondarily to the relays RT, has been interrupted, so that only one of the test relays can hold itself, the register will now also be determined. Now remains only to set up the RS-bridge belonging to the selected REG, to the selected SNR. The operation of the bridge has to be prepared by the operation of the code bars and consequently by the operation of the code magnets, in the same manner as has been the case in the operation of the selected bridges SLA and SLB. The relays A and B in the SLM-identifier and in the RS-identifier respectively determine which of the code magnets have to be operated.

According to the embodiment it has been supposed that the subscriber A11 has carried out a call which requires that in the SLM-identifier the relays A2 and B1 are operated. For obtaining a connection of the subscriber A11 it is necessary to operate the code relays CG1 and C1. Through a make contact of the relay A2 the relay CG1 operates and through a make contact of the relay B1 the code magnet C1 will operate by means of minus polarity from a make contact of the relay GA. Corresponding to the bridge selected, for example SLA1, the output 21 in the selected SLB-bridge has to be marked, which is carried out by operation of the code magnets CG2 and C1. Also said code magnets obtain minus from a contact of the operated GA-relay through contacts of the operated A2-relay and a contact of the relay TU which has operated secondarily to the operated relay 2T1. The latter has operated secondarily to the test relay 1T1 of the selected A-bridge as mentioned before. Depending on whether odd or even test relays T operate, the relay TU and TJ respectively is operated. The explanation of this is that a B-bridge can alternatively co-operate with two A-bridges according to the grouping plan in FIG. 5.

The code magnets in the RS-selector are operated in a similar way. According to the grouping plan in FIG. 6 there are two code selectors RS each having 10 bridges divided over two bridge rows, there being 15 outputs in each bridge, each output having 12 terminals. The inputs of the 4 bridges located in a vertical row are connected to the register which belongs to the respective vertical row, and in this manner each of the 5 registers can be connected to 60 outputs, of which only 50 are used according to the example. When supposing that the bridge SLB0 has been marked, the relays A1 and B1 have operated in the RS-identifier and the code magnets have to be operated in such manner that the output 1 in the RS1-selector is marked; that is, the code magnet C1 will be operated. The current path extends through the contact of the relay TA which has been operated by the operation of the relay RT, through contacts of the relay A and B, to the code magnet C1. The contacts of the B1-, B2-, and B3-, B4-relays respectively determine whether the code magnets of the RS1-selector or those of the RS2-selector should be operated. According to the example only the code magnet C1 is operated.

After the code magnets in the SLA- and SLB-selectors and in the RS-selector have been operated, the bridges can be operated which is carried out by connecting a current of short duration to the bridge magnets. Operation of the A-bridge is carried out by minus through a current path extending through a make contact of a relay US (which has operated by means of plus from the relay GB which in its turn has operated secondarily to the relay GA), a make contact of the secondary test relay 2T1, a make contact of the connecting relay VMA1, bridge magnet winding V1, and through a make contact of the relay US to plus. The B-bridges are similarly operated from a make contact of the relay US, through a make contact of the operated G-relay and through a make contact of the relay VMB1. The current to the code magnets and the bridges is interrupted by means of the relay K2 which operates secondarily to US.

Operation of the bridges in RS is carried out in such manner that the relay TB (which has operated secondarily to the relay TA which in its turn has operated secondarily to the operation of the relay RT) connects minus to the selected RS-bridge through the contact of a B-relay which determines the horizontal row in which the bridge is located according to FIG. 6, and through the contact of an RT-relay which determines in which vertical row the selected bridge is located. The relay TB operates the relay TC which in its turn interrupts the current to the bridge and also the current to the code magnets. After the setting up has been carried out, the busy relay RB of the register is held through the wire $c_1$ and $c$ respectively and through the winding of the relay BR of the subscriber which in this way operates and releases the marker.

The subscriber is now connected to the register REG through the wires $a_1b_1$, so that he can send the digits. Upon the seizing of the register the relay BR1 has operated and has connected plus polarity to the wire $f_1$ and $d_1$, so that the relay S8 has operated and the respective SLA-bridge has been busy-marked. If an idle signal from the called subscriber is obtained through the wires $a_2b_2$ and through the signal receiver SM, the relay RF in the register will operate and will connect minus polarity to the wire $e_1$. As a consequence of this, the relay S1 in SNR will operate and will connect the speech circiut of the calling subscriber to the current feeding relay S4 holding itself through the $c$-wire which latter obtains minus potential through the cut-off relay BR of the subscriber. REG is released when RB1 is released. The relay R8 holds itself by means of plus from a make contact of the relay S1. When the line of the called subscriber is in idle condition, the function of the SNR-relay set does not differ in any way from the function in conventional installation.

In FIG. 2 is shown by dashed lines the line equipment LU of the subscriber in the usual solution. The line relay set comprises besides the cut-off relay a blocking relay BL, the purpose of which is to connect buzzing sound to the speech circuit of the subscriber when the called subscriber is busy or there is some other obstacle against the setting up of the connection. Upon the operation of the relay BR also the relay BL will be operated, but no buzzing sound can be induced in the speech circuit of the subscriber as long as the relay BR is in operated condition. If no connection can be established, relay set SNR will be released and the relay BR releases. The relay BL which is delayed in releasing will now be held through the break contact of the BR-relay through the speech circuit of the subscriber and will simultaneously obtain buzzing sound through another break contact of the relay BR. Thus it appears that in the conventional system a special relay is necessary for each subscriber.

In the arrangement according to the invention the signalling signifying that the connection cannot be established, is carried out from the connection relay set SNR. When the register through the wires $a_2$, $b_2$ or $c_2$ obtains a signal from the next selector stage, indicating that the subscriber is busy or that there is congestion, the relay UP in the register will operate. The relay UP connects plus polarity through its make contact to the wire $g_1$ and operates in REG the relay RF which connects minus to the $e_1$-wire. Hereby the relays S1 and S3 operate in relay set SNR. The relay S1 holds itself from the *c*-wire through the winding of the relay BR and relay S3 holds itself by means of plus from a make contact of the relay S1. Register REG will be released when S1 operates. The relay S3 connects busy-tone to the speech circuit of the calling subscriber which circuit extends through a make contact of S1. The subscriber maintains SNR seized as long as he is listening to the buzzing sound and only when he replaces his handset, the current feeding relay S4 upon its releasing will connect short-circuiting plus to the relay S1, so that the latter releases and will release relay set SNR. According to the invention SNR and the connecting path from the subscriber to SNR are maintained busy only as long as the SNR-relay set or one of the selectors making part of the connecting path are not necessary from the point of view of traffic, for preventing congestion. In order to enable the marker to carry out a testing and to determine which connecting means are busy in conversation and which are busy only for signalling that a connection cannot be established, the relay S3 will connect on one hand a resistance MB to wire *d* which is intended for testing the condition of the SLA-bridges, and on the other hand it connects a resistance MC to the wire *e* which is used for testing the idle SLB-bridges and the idle SNR-relay sets respectively connected to the SLB-bridges. When a subscriber calls, the marker carries out a testing in the manner described before. If all the SLA-bridges through which the connecting path can extend, are busy, none of the test relays 1T0–1T9 can operate as there is plus marking on all the *d*-wires. Through a current path which from plus polarity and through make contacts of all of said test relays extends to the relay SRA, the latter will operate and connect minus polarity through the resistances MD0–MD9 in the marker to each of the test wires *d*. As mentioned before, the *d*-wire in SNR is connected to plus polarity through a resistance while in connecting relay sets which are busy in conversation, the *d*-wire is connected directly to plus polarity. Thus it is easy to see that in those SNR-relay sets in which the wire *d* is connected to plus polarity through a resistance MB, a potential drop will occur to the connecting point of the test relays 1T0–1T9. When supposing, for example that the resistances MA, MB and MD are equal, MA and MD being connected parallelly to minus polarity, ⅔ of the potential drop will occur across the resistance MB, so that the potential drop through the test relay will be sufficient upon suitable dimensioning to allow the relay to operate. In this manner all the test relays will operate, the bridges of which are occupied in a connection signalling an obstacle against setting up the connection and one of said bridges is selected, after which the setting up process is continued in the manner described before.

The test is carried out in a similar manner if all the SLB-bridges respectively the SNR-relay sets connected with the latter are busy. Through make contacts of all the F-relays F1–F5 which only can operate if one of the SNR-relay sets respectively SLB-bridges able to co-operate with the respective SLA-bridges, is idle, the relay SPB will operate and will connect plus polarity to the test wires *e* in the SNR-relay sets. When normal testing is carried out and the F-relays are connected to the *e*-wires, pure minus polarity is obtained for those SNR-relay sets which are idle, from the break contact of the relay RB in one of the registers. Plus polarity is obtained through a resistance ME which is dimensioned in such manner that the potential in the connecting point to the winding of the relay F is sufficient to permit the relay to operate. The situation will be similar if one of the G-relays is connected to plus polarity through the resistance MF and operates to select an idle SNR. For such SNR-relay sets which are occupied in the connection, the contact through the relay S1 is interrupted for the *e*-wire, but for such SNR-relay sets on the other hand which only are busy for signalling an obstacle against the setting up of the connection, the *e*-wire is connected to minus polarity through a resistance MC. If there is at least one idle SNR, the current paths of the test relays F and G extend through a resistance ME and MF respectively, so that only idle connecting relay sets which obtain minus polarity from the contact of the relay RB in REG, can be selected while the potential drop through the windings of the relays F and G will not be sufficient in such cases when SNR is maintained seized only for signalling an obstacle and the *e*-wire is connected to minus polarity through the resistance MC. If on the other hand, all the SNR-relay sets corresponding to idle SLA-bridges should be busy, the relay SPB will operate and will connect plus polarity directly to the F- and G-relays. Hereby all such SNR can give an idle test, through which the *e*-wire is connected to minus polarity through the resistance MC, so that the potential drop through the relays F and G will be sufficient for enabling the same to operate. In this manner an SNR-relay set is selected among those which are occupied for signalling an obstacle. Whereupon the connection is set up in the usual manner. As appears from the above, the connection signalling the obstacle is interrupted independently of the fact whether there is congestion in the SLA- or in the SLB-stage. The relays SPA and SPB hold themselves operated through their own hold contacts from plus through a make contact of the relay BB when the operating current path is interrupted through the break contacts of the test relays 1T0–1T9 respectively F1–F5.

The circuit arrangement according to the invention can of course be used not only for signalling busy or congestion conditions but also in such cases when the subscriber delays too long to begin the digit selection or makes too long intervals between the digits, so that the register is released by time-releasing. Also in this case the relay UP in REG will operate followed by the relay RF, the wires $e_1$ and $g_1$ obtaining a potential in the same manner as in the case described before. SNR is connected to the speech circuit of the subscriber and is maintained busy as long as the subscriber holds the handset respectively until SNR is necessary for setting up a new connection due to the lack of idle connecting means.

We claim:

1. An automatic telephone system comprising, in combination, connecting relay sets for establishing a connection between a calling subscriber and a called subscriber through the sets, each of said sets including means for maintaining operated the respective connecting relay set connected to the speech circuit of a calling subscriber in the presence of an operational condition preventing the establishment of a speech connection between the calling subscriber and a called subscriber, selector stages each including selectors and a marker for connecting the calling subscriber to an idle connecting set in response to a call, each of said markers comprising testing means including a test wire connected to the respective selectors and connecting relay sets and activating the marker in accordance with the busy or idle marking potential of the respective test wire as caused by the respective selector and connecting relay set, means for connecting said speech circuit to a source of sound through said connected connecting relay set, second testing means activated by a busy condition of all the selectors and connecting relay sets, said second testing means upon being activated changing the busy condition signifying potential of test wires connected to selectors and connecting relay sets included in a circuit connection between the calling subscriber and a connecting relay set and being operated only for the purpose of indicating an operational condition preventing the establishment of a speech circuit between the calling subscriber and the called subscriber to render said connecting relay sets and the selectors included in the speech circuit between the calling subscriber and said connecting relay sets accessible for setting up a speech circuit between the calling subscriber and the called subscriber whereby an indication is given to a calling subscriber that a speech circuit selected by him is not available due to an existing operational condition in the telephone system without requiring special indicating means in the line equipment of each individual subscriber, a source of potential, a first group of resistance means, circuit means for connecting each of said resistance means in series with one of said first testing means in response to a testing operation to supply an operating potential to the respective first testing means, said potential being divided between said resistance means and the corresponding first testing means, each of said resistance means being connected to the first testing means at the same point as the respective test wire, the drop of potential across said resistance means being indicative of the busy and idle marking potential respectively of the respective test wire, a busy marking potential blocking activation of the testing means and the idle marking potential permitting activation thereof, a second group of resistance means, and circuit means for connecting said second group of resistance means to the test wires connected to connecting relay sets in the operational condition preventing the establishment of a circuit connection to change the drop of potential across the resistance means in said first group from the busy marking potential to the idle marking potential.

2. An automatic telephone system comprising, in combination, connecting relay sets for establishing a connection between a calling subscriber and a called subscriber through the sets, each of said sets including means for maintaining operated the respective connecting relay set connected to the speech circuit of a calling subscriber in the presence of an operational condition preventing the establishment of a speech connection between the calling subscribed and a called subscriber, selector stages each including selectors and a marker for connecting the calling subscriber to an idle connecting set in response to a call, each of said markers comprising testing means including a test wire connected to the respective selectors and connecting relay sets and activating the marker in accordance with the busy or idle marking potential of the respective test wire as caused by the respective selector and connecting relay set, means for connecting said speech circuit to a source of sound through said connected connecting relay set, second testing means activated by a busy condition of all the selectors and connecting relay sets, said second testing means upon being activated changing the busy condition signifying potential of test wires connected to selectors and connecting relay sets included in a circuit connection between the calling subscriber and a connecting relay set operated only for the purpose of indicating an operational condition preventing the establishment of a speech circuit between the calling subscriber and the called subscriber to render said connecting relay sets and the selectors included in the speech circuit between the calling subscriber and said connecting relay sets accessible for setting up a speech circuit between the calling subscriber and the called subscriber, whereby an indication is given to a calling subscriber that a speech circuit selected by him is not available due to an existing operational condition in the telephone system without requiring special indicating means in the line equipment of each individual subscriber, a source of voice frequency, and circuit means for connecting said source of voice frequency to the speech circuit of the calling subscriber through a connecting relay set in the condition indicating a present operational condition preventing the establishment of a speech circuit connection.

References Cited by the Examiner

UNITED STATES PATENTS

| | | | |
|---|---|---|---|
| 2,591,580 | 4/52 | Michal | 179—18 |
| 2,871,297 | 1/59 | Leonard | 179—22 |

ROBERT H. ROSE, *Primary Examiner.*

WILLIAM C. COOPER, *Examiner.*